US009213703B1

(12) United States Patent
Postelnicu et al.

(10) Patent No.: US 9,213,703 B1
(45) Date of Patent: Dec. 15, 2015

(54) PITCH SHIFT AND TIME STRETCH RESISTANT AUDIO MATCHING

(71) Applicant: Google Inc., Mountain View, CA (US)

(72) Inventors: Gheorghe Postelnicu, Zürich (CH); Matthew Sharifi, Zürich (CH)

(73) Assignee: Google Inc., Mountain View, CA (US)

( * ) Notice: Subject to any disclaimer, the term of this patent is extended or adjusted under 35 U.S.C. 154(b) by 411 days.

(21) Appl. No.: 13/670,453

(22) Filed: Nov. 6, 2012

Related U.S. Application Data

(60) Provisional application No. 61/664,737, filed on Jun. 26, 2012.

(51) Int. Cl.
*G06F 17/00* (2006.01)
*G06F 17/30* (2006.01)
*G10L 25/51* (2013.01)
*G10L 25/90* (2013.01)
*G10L 25/54* (2013.01)

(52) U.S. Cl.
CPC ...... *G06F 17/3002* (2013.01); *G06F 17/30761* (2013.01); *G10L 25/51* (2013.01); *G10L 25/54* (2013.01); *G10L 2025/906* (2013.01)

(58) Field of Classification Search
CPC .......... G06F 17/3002; G06F 17/30761; G10L 25/51; G10L 21/54; G10L 2025/906

USPC .......................................................... 700/94
See application file for complete search history.

(56) References Cited

U.S. PATENT DOCUMENTS

| 7,346,512 | B2 | 3/2008 | Wang et al. | |
|---|---|---|---|---|
| 8,543,386 | B2* | 9/2013 | Oh et al. | 704/201 |
| 8,738,633 | B1* | 5/2014 | Sharifi et al. | 707/747 |
| 8,953,811 | B1* | 2/2015 | Sharifi et al. | 381/56 |
| 2006/0045211 | A1* | 3/2006 | Oh et al. | 375/329 |
| 2006/0122839 | A1* | 6/2006 | Li-Chun Wang et al. | 704/273 |
| 2010/0208779 | A1* | 8/2010 | Park et al. | 375/219 |
| 2011/0173208 | A1* | 7/2011 | Vogel | 707/746 |
| 2014/0310006 | A1* | 10/2014 | Anguera Miro et al. | 704/500 |

OTHER PUBLICATIONS

Ioffe: Improved Consistent Sampling; c2010.*

* cited by examiner

*Primary Examiner* — Paul McCord
(74) *Attorney, Agent, or Firm* — Fenwick & West LLP

(57) ABSTRACT

Systems and methods are provided herein relating to audio matching. Descriptors can be generated based on anchor points and interest points that characterize the local neighborhood surrounding the anchor point. Characterizing the local spectrogram neighborhood surrounding anchor points can be more robust to pitch shift distortions and time stretch distortions. Those anchor points surrounded by a lack of spectral activity or even spectral activity can be filtered from further examination. Using these pitch shift and time stretch resistant audio features within descriptors can provide for more accurate and efficient audio matching.

20 Claims, 14 Drawing Sheets

PITCH SHIFT AND TIME STRETCH RESISTANT AUDIO MATCHING

CROSS REFERENCE TO RELATED APPLICATIONS

This application claims the benefit of U.S. Provisional Application No. 61/664,737, filed Jun. 26, 2012, and entitled "PITCH SHIFT AND TIME STRETCH RESISTANT AUDIO MATCHING", the entirety of which is incorporated herein by reference.

TECHNICAL FIELD

This application relates to audio matching, and more particularly to using pitch shift and time stretch resistant features of an audio sample in audio matching.

BACKGROUND

Audio matching provides for identification of a recorded audio sample by comparing an audio sample to a set of reference samples. One example of a recorded audio sample can be an audio track of a video. To make the comparison, an audio sample can be transformed to a time-frequency representation of the sample by using, for example, a short time Fourier transform (STFT). Using the time-frequency representation, interest points that characterize time and frequency locations of peaks or other distinct patterns of the spectrogram can then be extracted from the audio sample. Descriptors can be computed as functions of sets of interest points. Descriptors of the audio sample can then be compared to descriptors of reference samples to determine the identity of the audio sample.

In a typical descriptor audio matching system, interest points uniquely characterize an audio signal; thus, there is likely little overlap between interest points of two different segments of the audio sample. Pitch-shifting can affect an audio sample by shifting the frequency of interest points. Time stretching can affect an audio sample by shifting the time of interest points. For example, when trying to match audio played on the radio, television, or in a remix of a song, the speed of the audio sample may be slightly changed from the original. A change in speed can change the timing of interest points within an audio sample. In addition, samples that have altered speed will also likely have an altered pitch. Even a small pitch shift that is hard to notice for listeners may present difficult challenges in matching the pitch shifted signal due to interest points being altered from the pitch shift. Therefore, it is desirable to identify and use supplementary features of interest points that can be incorporated within a descriptor or supplemented to a descriptor in a manner that are robust to both pitch shift distortion and time stretching.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

An input component can receive an audio sample. A spectrogram component can generate a spectrogram of the audio sample. An anchor detection component can generate a set of anchor points wherein anchor points in the set of anchor points are local maxima in time/frequency windows of the spectrogram. An interest point detection component can generate a set of interest points based on a strength threshold and a set of frequency bands. A histogram component can generate a set of histograms based on the set of anchor points, the set of interest points and a set of frequency bins wherein histograms in the set of histograms are associated with an anchor point among the set of anchor points.

In another implementation, a feature vector component can generate a set of feature vectors based on the set of histograms wherein feature vectors in the set of feature vectors are associated with an anchor point among the set of anchor points and contain a count of interest points within respective frequency bins. A descriptor component can generate a set of descriptors for the audio sample by quantizing and hashing the set of feature vectors. A matching component can identify the audio sample based on comparing the set of descriptors to a set of reference descriptors.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1A:
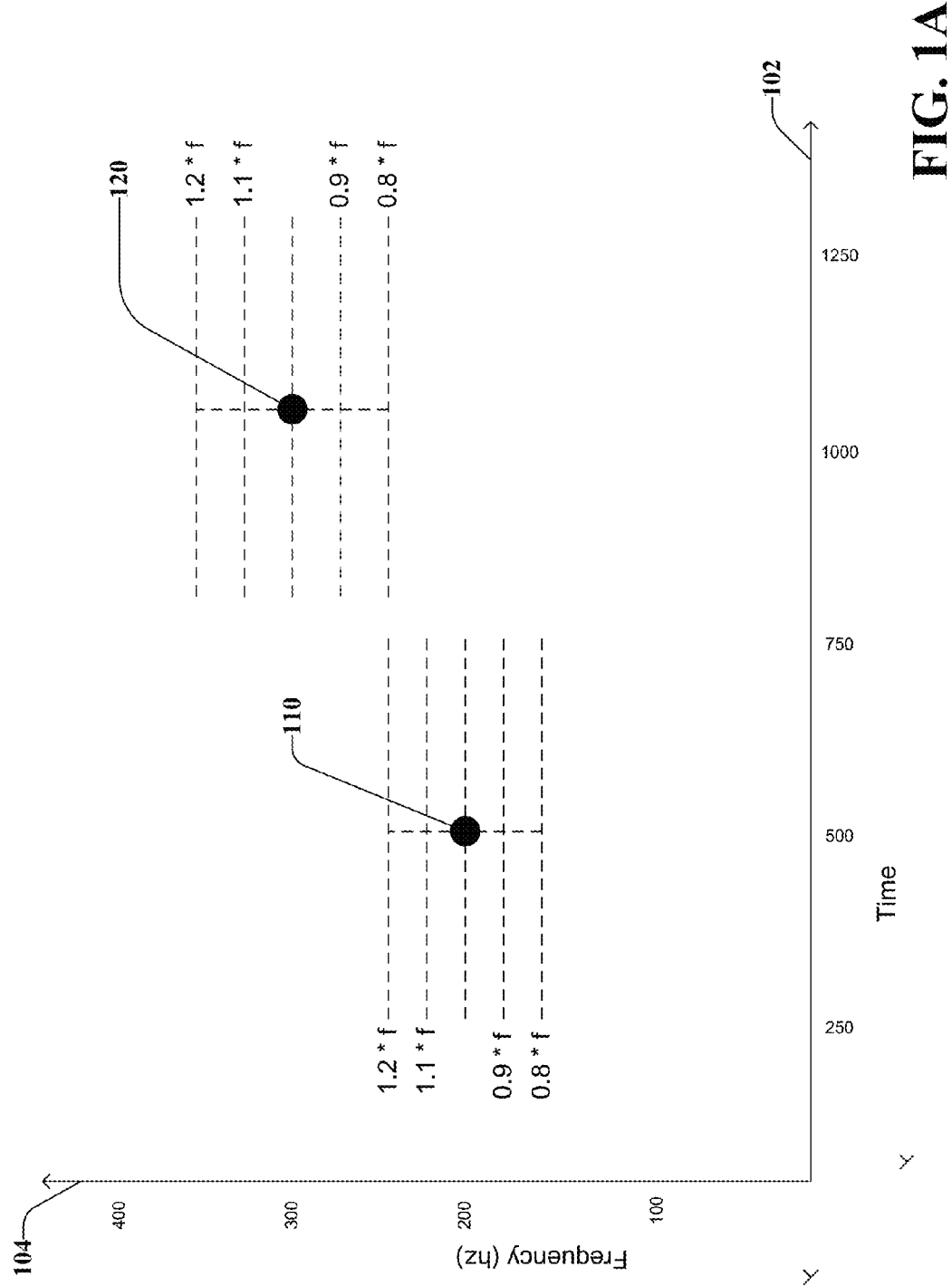
FIG. 1A illustrates an example time/frequency plot of anchor points and frequency bins in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves analyzing an audio sample for unique characteristics that can be used in comparison to unique characteristics of reference samples to identify the audio sample. As a starting point for this analysis, a spectrogram of the audio signal can be constructed. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at one or more specific frequencies and measure amplitude of the audio sample at that specific frequency over time. The audio sample can be run through additional filters to individually isolate a set of frequencies to measure the amplitude of the set over time. A spectrogram can be created by combining all the measurements over time on the frequency axis to generate a spectrogram image of frequency amplitudes over time.

A second technique involves using the short-time Fourier transform ("STFT") to break down an audio sample into time windows, where each window is Fourier transformed to calculate a magnitude of the frequency spectrum for the duration of each window. Combining a plurality of windows side by side on the time axis of the spectrogram creates an image of frequency amplitudes over time. Other techniques, such as wavelet transforms, can also be used to construct a spectrogram.

Creating and storing in a database an entire spectrogram for a plurality of reference samples can use large amounts of storage space and affect scalability of an audio matching system. Therefore, it can be desirable instead to calculate and store compact descriptors of reference samples versus an entire spectrogram. One method of calculating descriptors is to first determine individual interest points that identify unique characteristics of local features of the time-frequency representation of the reference sample. Descriptors can then be computed as functions of sets of interest points.

Calculating interest points involves identifying unique characteristics of the spectrogram. For example, an interest point could be a spectral peak of a specific frequency over a specific window of time. As another non-limiting example, an interest point could also include timing of the onset of a note. It is to be appreciated that conceivably any suitable spectral event over a specific duration of time could constitute an interest point.

For an audio sample experiencing pitch-shift distortion, the frequency of interest points can be distorted in that the measured frequency of an audio sample experiencing a pitch-shift at a specific point in time may vary from a clean reference sample of the same audio that is not experiencing distortion. As interest points within a fingerprint represent unique frequency events at specific moments in time, pitch-shifted interest points within a fingerprint may lead to a failure in identification of the audio sample.

While pitch-shifted frequencies can misrepresent the identity of an audio sample, supplementing interest points within a descriptor with additional features that are more resistant to pitch shift distortion can greatly improve the robustness of a system to pitch-shift distortion.

Systems and methods herein provide for first determining a set of stable, unique interest points further described herein as anchor points. Descriptors can then be computed based on characterizing the local spectrogram neighborhood around the anchor points. As discussed in greater detail below, various implementations provide for determining a set of anchor points and then determining a set of interest points in the spectrogram based on a strength threshold and a set of frequency bands. For example, the strongest ten percent of time/frequency points within respective frequency bands of the spectrogram can be determined as interest points. Using frequency bins related to the anchor point, interest points within each frequency bin can be counted and used to characterize the spectrogram neighborhood surrounding the anchor point. Feature vectors can be generated based on the amount of interest points within frequency bins. Descriptors can be computed by quantizing accumulated feature vectors and hashing the set of quantized features. Descriptors that characterize the spectrogram neighborhood surrounding anchor points can be more resistant to pitch shifts and time stretching, as the characterization of the neighborhood is more robust to distortions than the individual anchor points or interest points.

Referring now to FIG. 1A, there is illustrated an example time/frequency plot of anchor points and frequency bins in accordance with implementations of this disclosure. The vertical axis 104 or y axis plots frequency readings, in hertz, from the audio sample. The horizontal axis 102 or x axis plots the time, in time units, of the audio sample. Anchor points can be detected within a spectrogram as local maxima in time/frequency windows centered on the anchor point, within the spectrogram. Anchor points, in one implementation, can be relatively sparse, generated at a frequency of about 10 per second. Anchor points should be stable to transforms such as time stretching, and pitch shifts. For example, after applying a pitch shift and/or time stretch transform to an audio sample, previously identified anchor points should be stable enough, even after applying the transforms, that the same set of anchor points identified prior to applying the transforms are identified as anchor points after applying the transforms.

Along with anchor points, other particles or interest points can be detected within the spectrogram. These interest points are an attempt to capture the local structure of the audio signal at a given position. Interest points can be detected, in one implementation, by taking a top percentage of points within the entire spectrogram based on strength or magnitude. For example, the top 10% of points in strength or magnitude, within the spectrogram, can be detected as interest points. In another implementation, to avoid bias in certain frequency ranges, the spectrogram can be divided into frequency bands, and the top 10% of points in strength or magnitude, within each frequency band, can be detected as interest points. It can be appreciated that the bands can be narrower at lower frequencies to create a higher density of interest points in low frequency bands.

FIG. 1A shows two example anchor points, points 110 and 120. Anchor point 110 is at a frequency of 200 Hz at a time of 500 time units. Anchor point 120 is at a frequency of 300 Hz at a time of 1000 time units. To characterize the neighborhood surrounding an anchor point, the number of interest points surrounding the anchor point can be counted. To give more specificity to the count, the count can be separated based on frequency bin boundaries surrounding the anchor point. For example, frequency bin boundaries can be determined based on multiples of the anchor point frequency. In the depicted example, where f is the frequency of the anchor point, frequency bins are established at the following levels: 1.2*f, 1.1*f, f, 0.9*f, and 0.8*f. It can be appreciated that the example frequency bins are only one possibility as other frequency bin algorithms can be employed. As the frequency bins are computed as a function of the frequency of the anchor point, in this example, anchor points at higher frequencies will have larger bins.

In one implementation, after an anchor point and interest points have been identified, a frequency window can be established around the anchor point. For example, the frequency window in the depicted example are all frequencies between 1.2*f and 0.8*f. For a selected frequency window, the closest K interest points (where "K" is an integer) within the frequency window can be determined, where the K interest points can occur both before and after the anchor point in the time domain. Thus, a time window is generated where the window boundaries are defined based on the two points of the K interest points that occurred the earliest in time and the latest in time respectively.

Figure 1B:
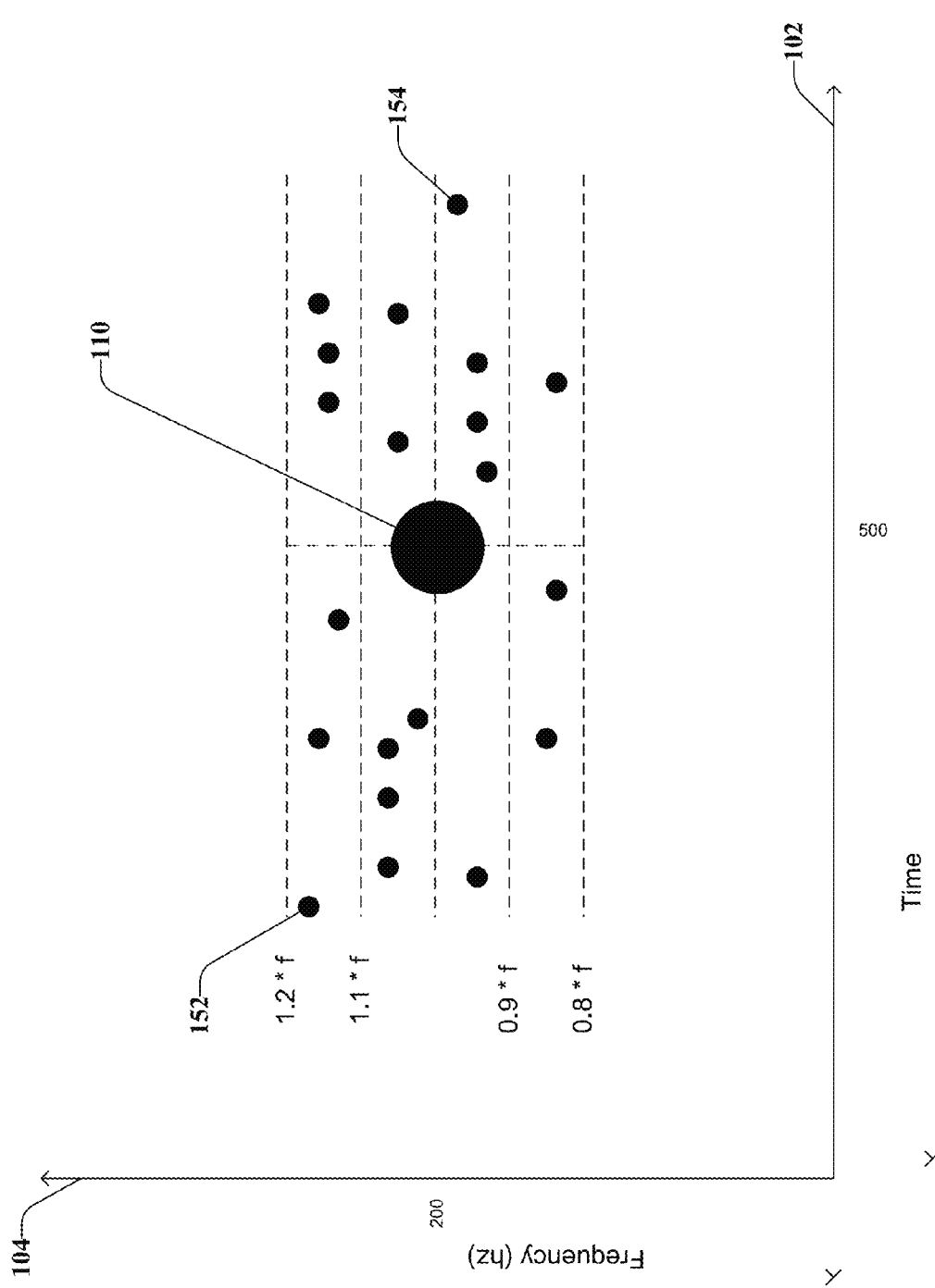
FIG. 1B illustrates an example time/frequency plot of an anchor point, related frequency bins, and associated interest points in accordance with implementations of this disclosure.

Referring now to FIG. 1B, there is illustrated an example time/frequency plot of an anchor point, related frequency bins, and associated interest points in accordance with implementations of this disclosure. In the depicted example, K has been set to 20, e.g., the closest 20 interest points to anchor point 110 within the associated frequency bins have been determined. The earliest occurring of the K points, point 152 defines the time window one side and the latest occurring of the K points, point 154 defines the time window on the other side.

Once the K points are considered, a histogram can be built around the anchor point 110 at the center position of the histogram. The histogram can be divided based on the frequency bins, such as the frequency bins described in the above example and depicted in FIG. 1B. A count can be determined that counts the number of the K points within each frequency bin, and the counts in each bin can populate the histogram. For example, within the frequency bin with boundaries of 1.2*f and 1.1*f, six interest points populate the frequency bin. Within the frequency bin with boundaries of 1.1*f and f, six interest points populate the frequency bin. Within the frequency bin with boundaries of f and 0.9*f, five interest points populate the frequency bin. Within the frequency bin with boundaries of 0.9*f and 0.8*f, 3 interest points populate the frequency bin.

From the histogram, a set of feature vectors can be generated. Feature vectors can then be quantized and hashed to form descriptors. In one implementation, K-Means, hierarchical K-Means, or other quantization algorithms can be used to quantize feature vectors. Quantized feature vectors can be grouped using a rolling window. A weighted min hash can be used to hash the quantized feature vectors. When comparing descriptors of an audio sample to a descriptor of a reference sample in an attempt to identify the audio sample, in one implementation, the Hamming distance between two descriptors can be used to make the comparison. In another implementation, the L1 distance between two feature vectors can be used to make a comparison between feature vectors.

Figure 2:
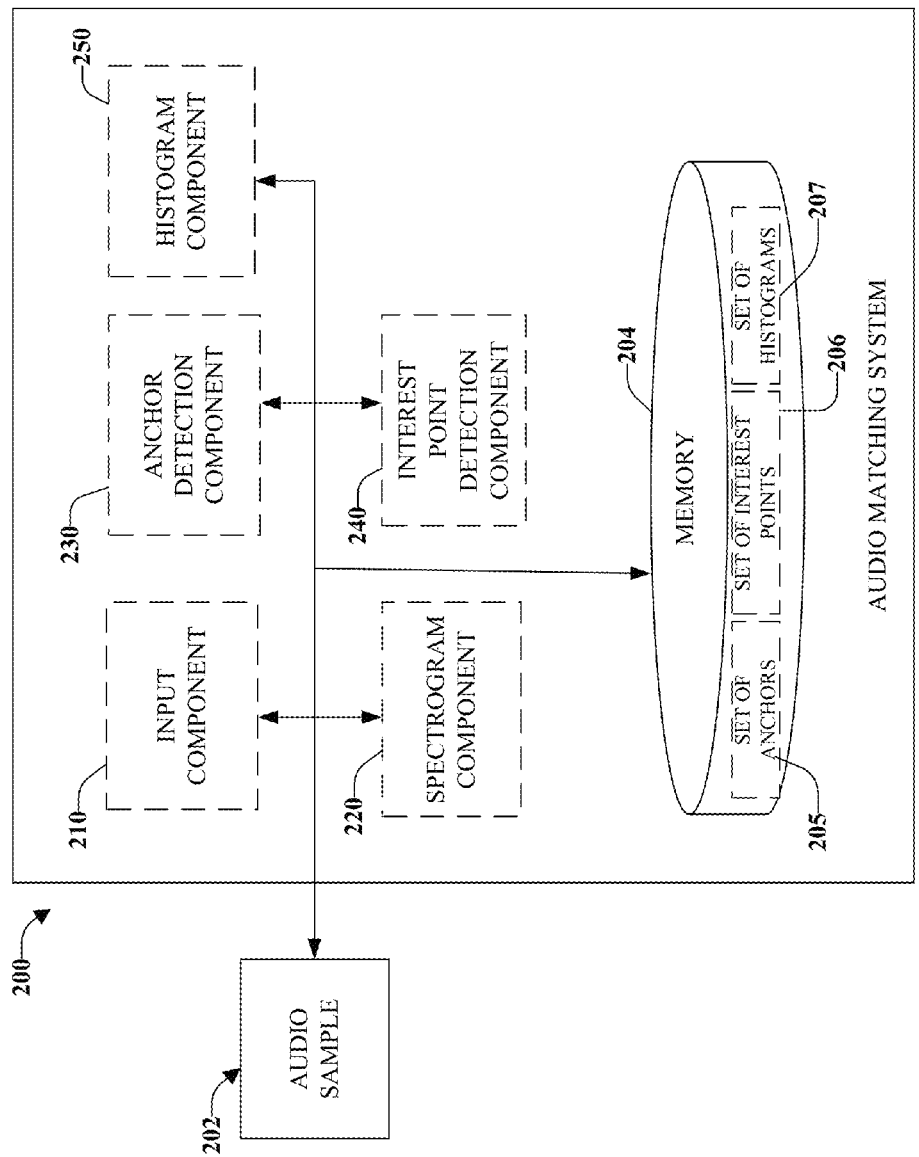
FIG. 2 illustrates a high-level functional block diagram of an example audio matching system in accordance with implementations of this disclosure.

Referring now to FIG. 2, there is illustrated a high-level functional block diagram of an example audio matching system in accordance with implementations of this disclosure. In FIG. 2, an audio matching system 200 includes an input component 210, a spectrogram component 220, an anchor detection component 230, an interest point detection component 240, a histogram component 250, and a memory 204, each of which may be coupled as illustrated. An input component 210 can receive an audio sample 202.

A spectrogram component 220 can generate a spectrogram of the audio sample. For example, the spectrogram can be generated using fast Fourier transforms with overlapping windows. An anchor detection component 230 can generate a set of anchor points wherein anchor points in the set of anchor points are local maxima in time/frequency windows of the spectrogram. In one implementation, anchor detection component can further quantize anchor points in the set of anchor points. The set of anchor points 205 can be stored within memory 204 for access by other components.

An interest point detection component 240 can generate a set of interest points based on a strength threshold and a set of frequency bands. For example, all points that meet or exceed the strength threshold within the spectrogram can be identified as interest points. In another example, to avoid bias in certain frequency ranges, the spectrogram can be divided into frequency bands where those points that meet or exceed the strength threshold in each frequency band can be selected. The set of interest points 206 can be stored within memory 204 for access by other components.

A histogram component 250 can generate a set of histograms based on the set of anchor points, the set of interest points and a set of frequency bins wherein histograms in the set of histograms are associated with an anchor point among the set of anchor points. In one implementation, the set of frequency bins can be based on a quantized frequency of the anchor point. For example, if f(anchor) is the frequency of the anchor point, then frequency bins can be placed at f(anchor)*0.8, f(anchor)*0.9, f(anchor), f(anchor)*1.1, f(anchor)*1.2. The set of histograms 207 can be stored within memory 204 for access by other components.

Figure 3:
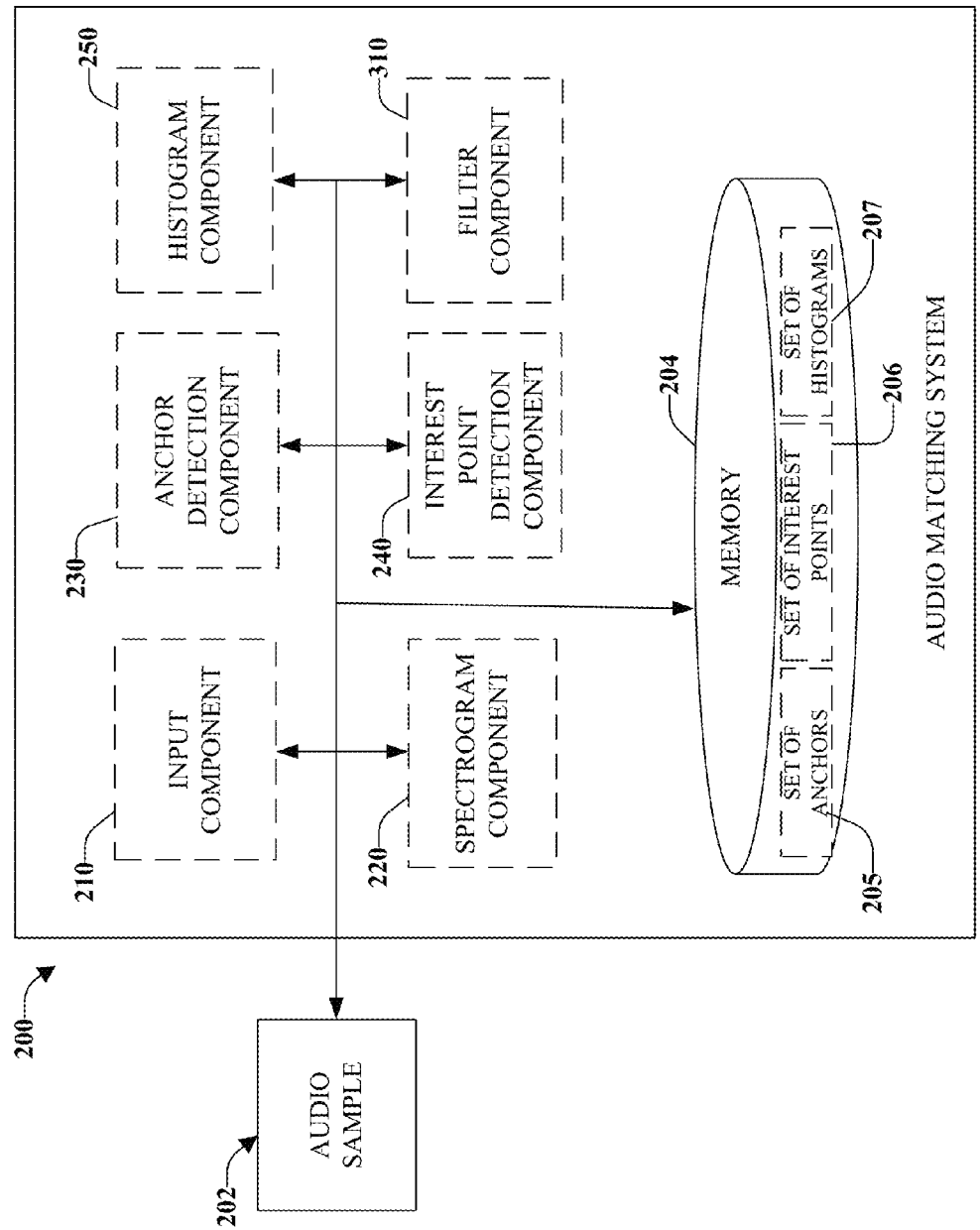
FIG. 3 illustrates a high-level functional block diagram of an example audio matching system including a filter component in accordance with implementations of this disclosure.

Referring now to FIG. 3, there is illustrated a high-level functional block diagram of an example audio matching system including a filter component 310 in accordance with implementations of this disclosure. Filter component 310 can filter the set of histograms 207 stored within memory 204 based on at least one of inactive frequency bins or equal frequency bin activity. For example, if a majority of the frequency bins contain little or no interest points, then the histogram can be filtered from the set of histograms as such a histogram may not be informative enough. In another example, if all the frequency bins have equal activity, the histogram can be filtered, as it may not be discriminative enough. It can be appreciated that other filtering algorithms can be employed as well.

Figure 4:
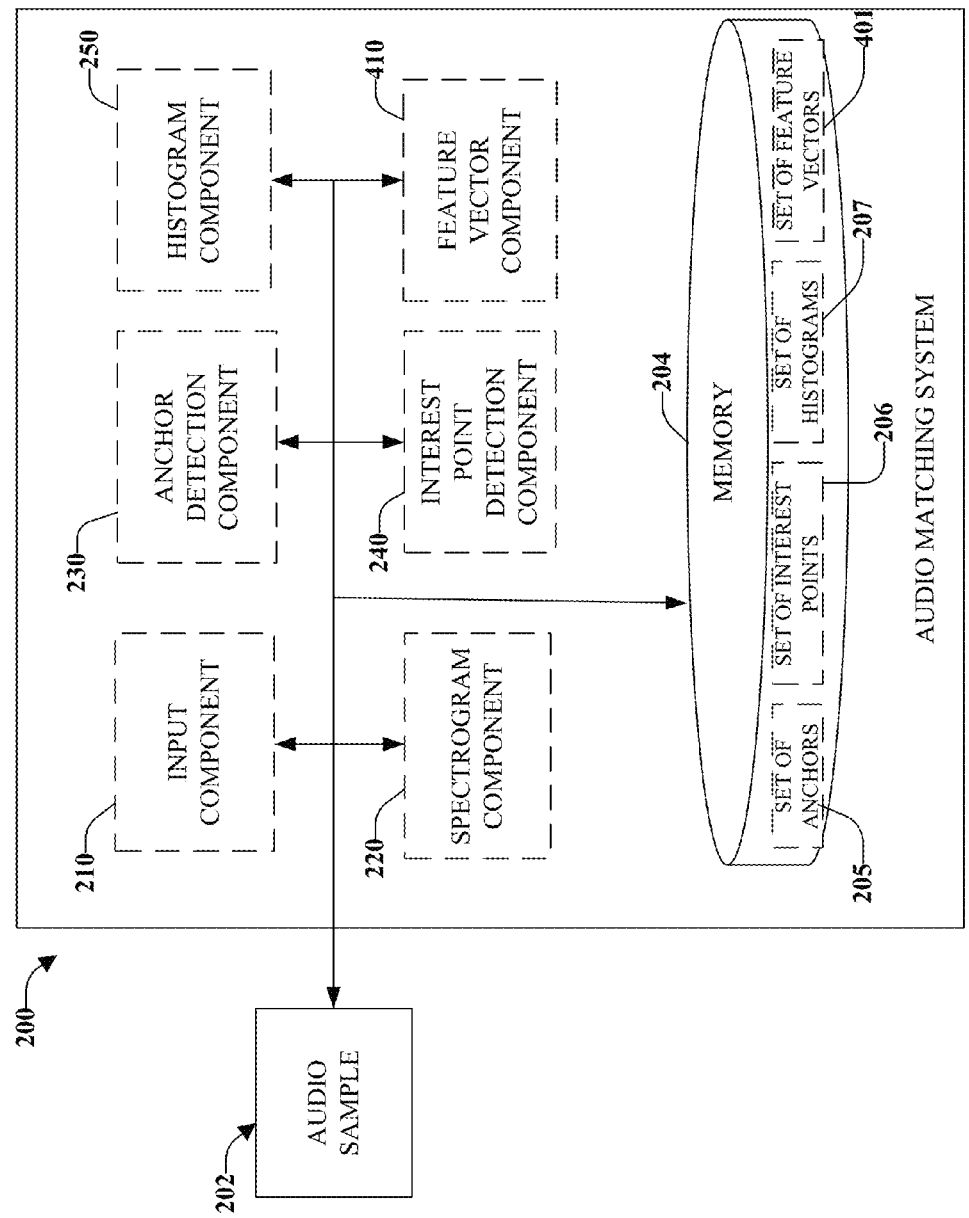
FIG. 4 illustrates a high-level functional block diagram of an example audio matching system including a feature vector component in accordance with implementations of this disclosure.

Referring now to FIG. 4, there is illustrated a high-level functional block diagram of an example audio matching system including a feature vector component 410 in accordance with implementations of this disclosure. Feature vector component 410 can generate a set of feature vectors based on the set of histograms 207, stored within memory 204, wherein feature vectors in the set of feature vectors are associated with an anchor point among the set of anchor points and contain a count of interest points within respective frequency bins. The set of feature vectors 401 can be stored within memory 204 for access by other components.

Figure 5:
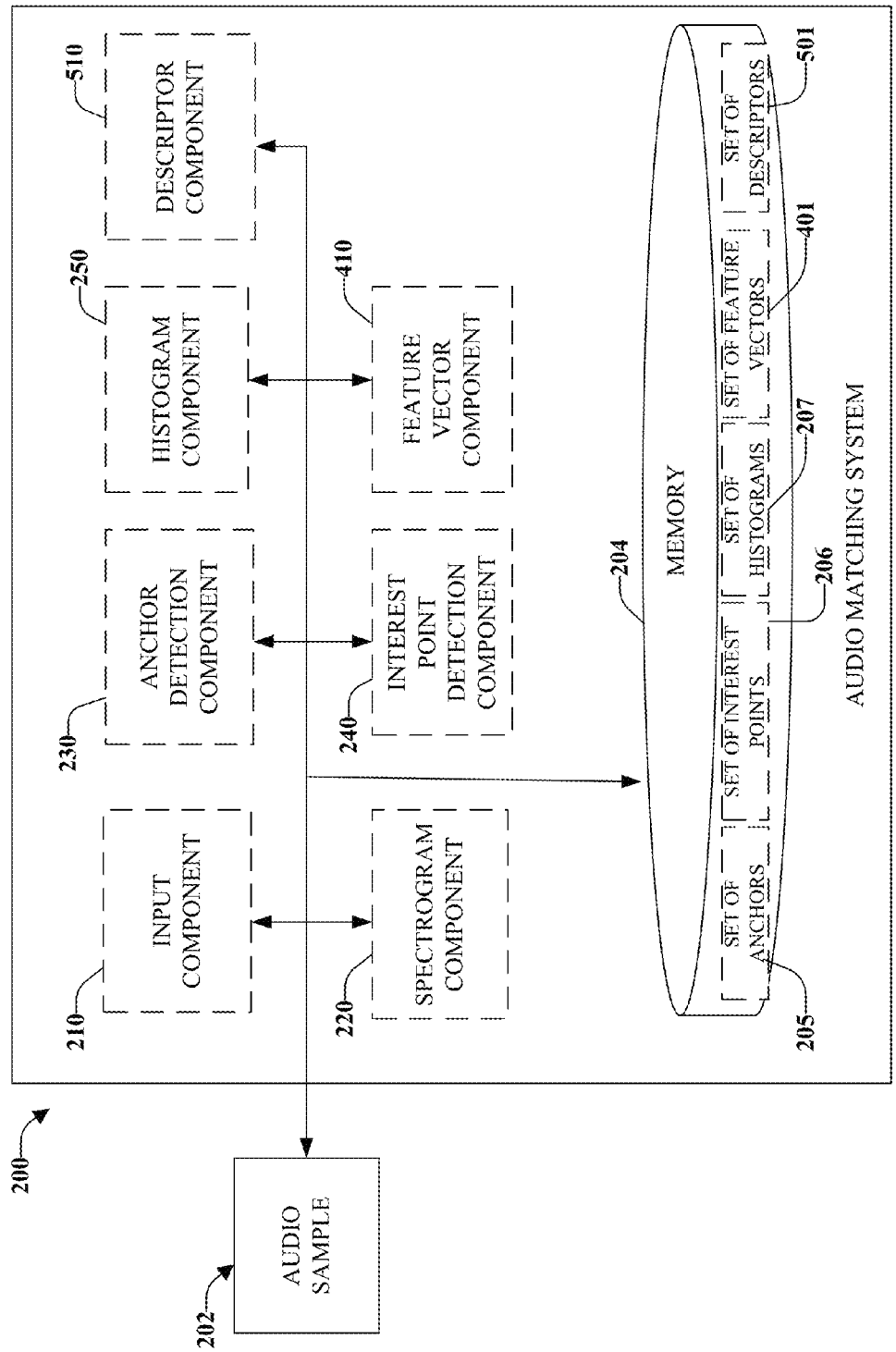
FIG. 5 illustrates a high-level functional block diagram of an example audio matching system including descriptor component in accordance with implementations of this disclosure.

Referring now to FIG. 5, there is illustrated a high-level functional block diagram of an example audio matching system including descriptor component 510 in accordance with implementations of this disclosure. Descriptor component 510 can generate a set of descriptors for the audio sample by quantizing and hashing the set of feature vectors. For example, in one implementation, quantized features vectors can be accumulating over a rolling time window that incrementally increases based on a time step. The quantized set of feature vectors can then be hashed. In one example, a weighted minhash can be used. The set of descriptors 501 can be stored within memory 204 for access by other components.

Figure 6:
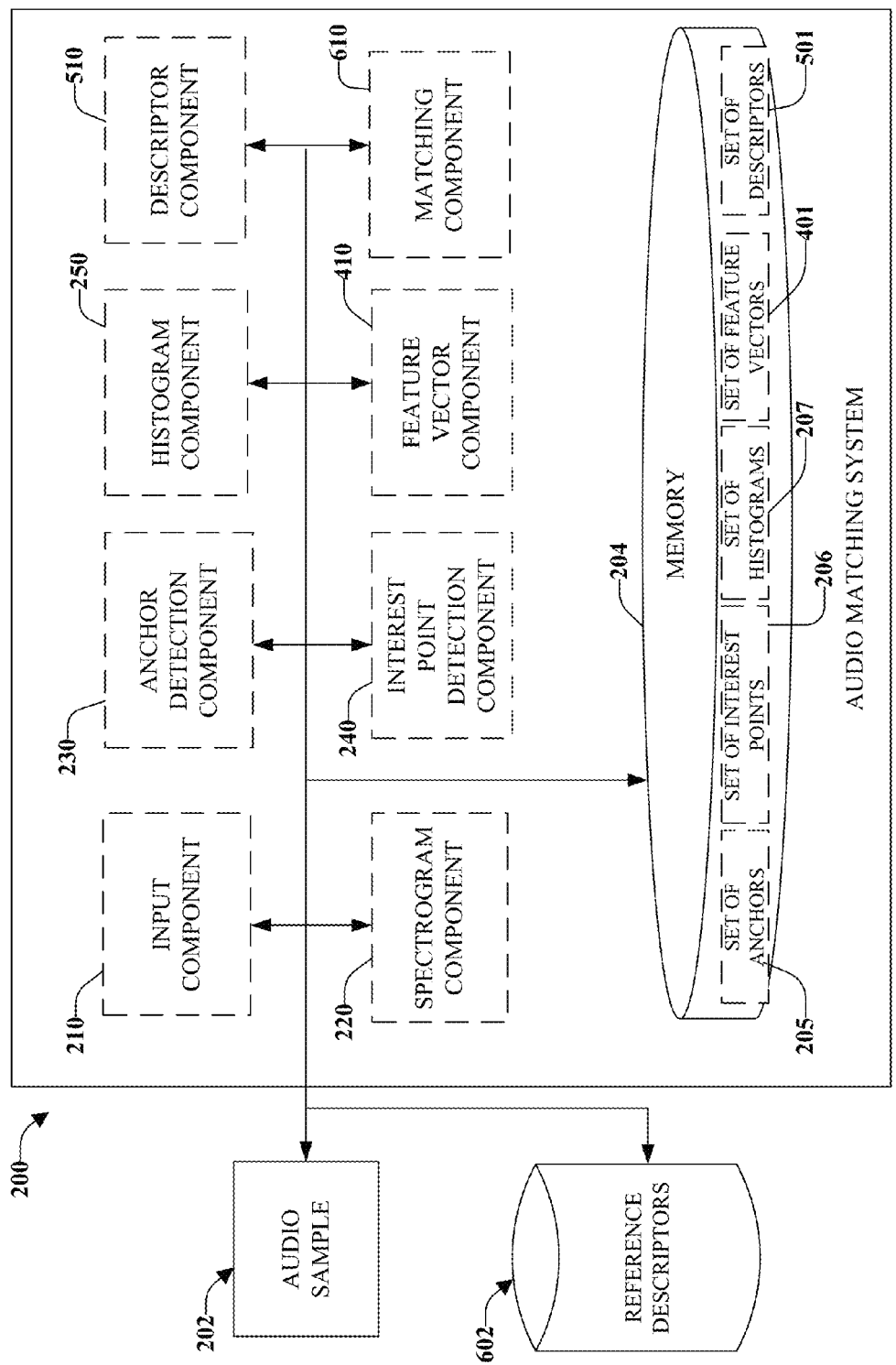
FIG. 6 illustrates a high-level functional block diagram of an example audio matching system including a matching component in accordance with implementations of this disclosure.

Referring now to FIG. 6, there is illustrated a high-level functional block diagram of an example audio matching system including a matching component 610 in accordance with implementations of this disclosure. Matching component 610 can identify the audio sample based on comparing the set of descriptors to a set of reference descriptors 602. For example, descriptors can be compared for a similarity by using the Hamming distance between two sets of descriptors. The set of reference descriptors 602 can be located within system 200 or disparate from system 200, such as hosted within a cloud computing environment for access by a plurality of audio matching or other content matching systems.

FIGS. 7-11 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 7:
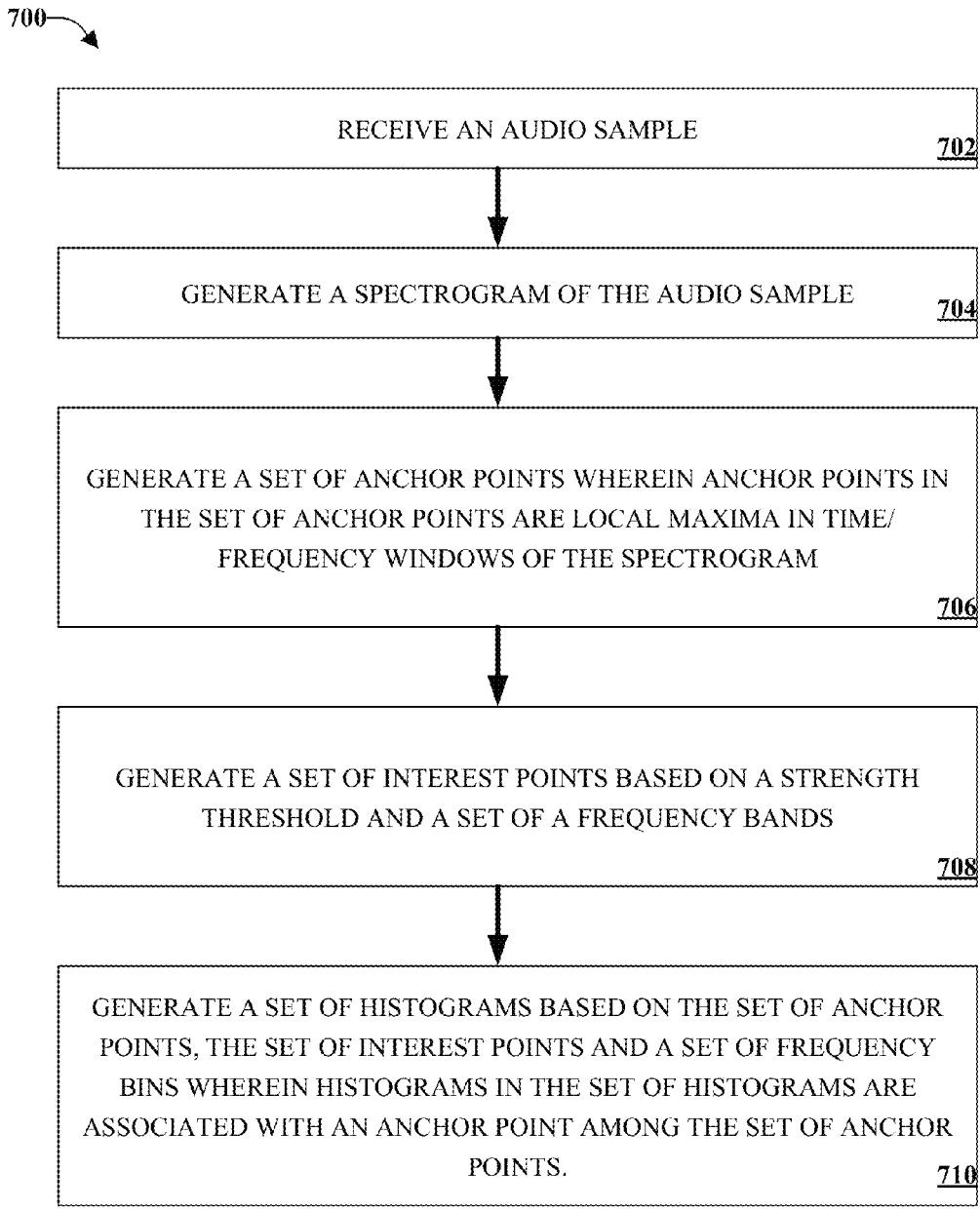
FIG. 7 illustrates an example method for audio matching in accordance with implementations of this disclosure.

Referring now to FIG. 7 there is illustrated an example method for audio matching in accordance with implementations of this disclosure. At 702, an audio sample can be received (e.g., by an input component). At 704, a spectrogram can be generated (e.g., by a spectrogram component). At 706, a set of anchor points can be generated (e.g., by an anchor detection component) wherein anchor points in the set of anchor points are local maxima in time/frequency windows of the spectrogram. In one implementation, anchor points in the set of anchor points can be quantized. At 708, a set of interest points can be generated (e.g., by an interest point detection component) based on a strength threshold and a set of frequency bands. At 710, a set of histograms can be generated (e.g., by a histogram component) based on the set of anchor points, the set of interest points and a set of frequency bins wherein histograms in the set of histograms are associated with an anchor point among the set of anchor points. In one implementation, the set of frequency bins can be based on the quantized frequency of the anchor point.

Figure 8:
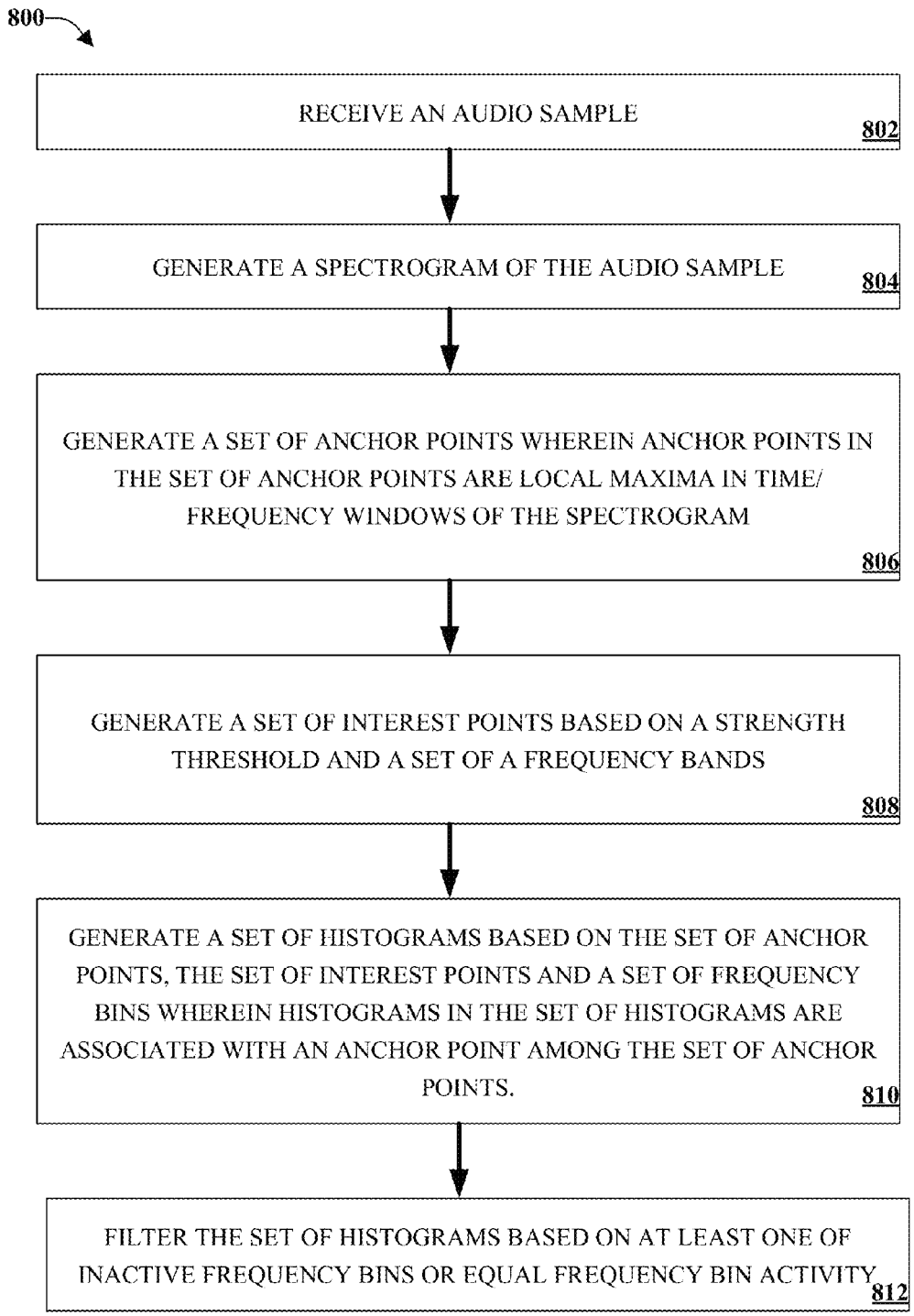
FIG. 8 illustrates an example method for audio matching including a filter in accordance with implementations of this disclosure.

Referring now to FIG. 8 there is illustrated an example method for audio matching including a filter in accordance with implementations of this disclosure. At 702, an audio sample can be received (e.g., by an input component). At 804, a spectrogram can be generated (e.g., by a spectrogram component). At 806, a set of anchor points can be generated (e.g., by an anchor detection component) wherein anchor points in the set of anchor points are local maxima in time/frequency windows of the spectrogram. At 808, a set of interest points can be generated (e.g., by an interest point detection component) based on a strength threshold and a set of frequency bands. At 810, a set of histograms can be generated (e.g., by a histogram component) based on the set of anchor points, the set of interest points and a set of frequency bins wherein histograms in the set of histograms are associated with an anchor point among the set of anchor points. At 812, the set of histograms can be filtered (e.g., by a filter component) based on at least one of inactive frequency bins or equal frequency bin activity.

Figure 9:
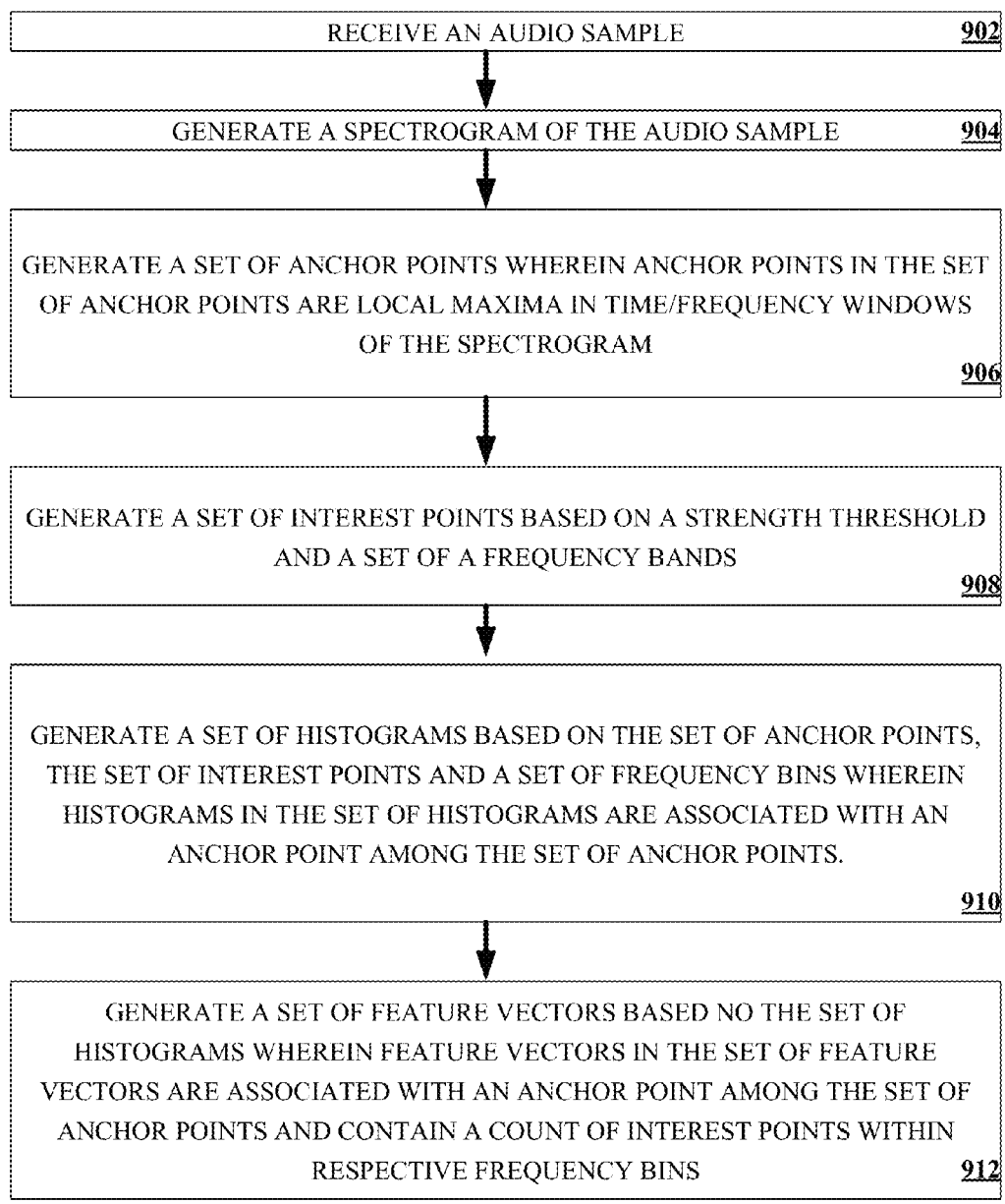
FIG. 9 illustrates an example method for audio matching including generating feature vectors in accordance with implementations of this disclosure.

Referring now to FIG. 9 there is illustrated an example method for audio matching including generating feature vectors in accordance with implementations of this disclosure. At 902, an audio sample can be received (e.g., by an input component). At 904, a spectrogram can be generated (e.g., by a spectrogram component). At 906, a set of anchor points can be generated (e.g., by an anchor detection component) wherein anchor points in the set of anchor points are local maxima in time/frequency windows of the spectrogram. At 908, a set of interest points can be generated (e.g., by an interest point detection component) based on a strength threshold and a set of frequency bands. At 910, a set of histograms can be generated (e.g., by a histogram component) based on the set of anchor points, the set of interest points and a set of frequency bins wherein histograms in the set of histograms are associated with an anchor point among the set of anchor points. At 912, a set of feature vectors can be generated (e.g., by a feature vector component) based on the set of histograms wherein feature vectors in the set of feature vectors are associated with an anchor point among the set of anchor points and contain a count of interest points within respective frequency bins.

Figure 10:
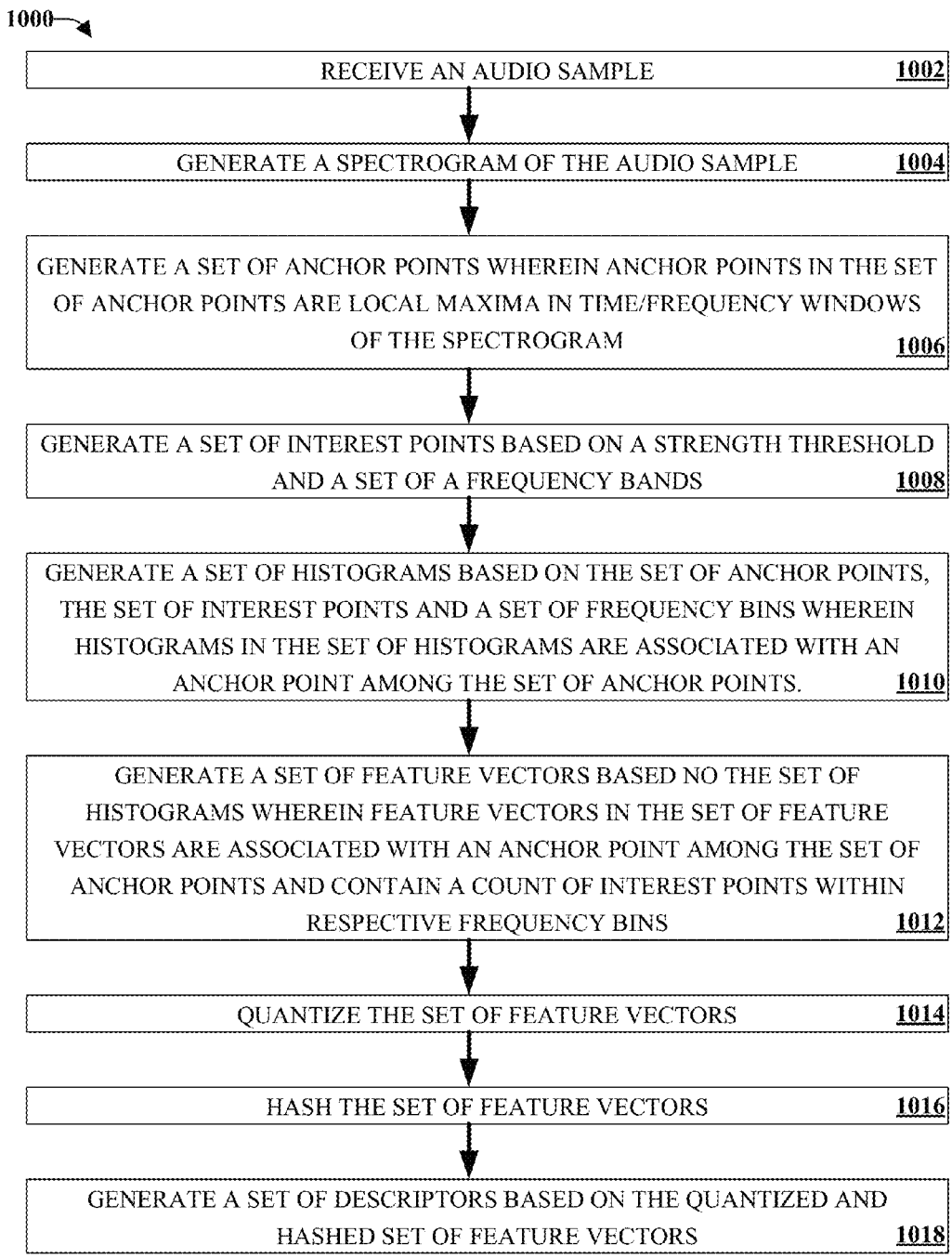
FIG. 10 illustrates an example method for audio matching including generating descriptors in accordance with implementations of this disclosure.

Referring now to FIG. 10 there is illustrated an example method for audio matching including generating descriptors in accordance with implementations of this disclosure. At 1002, an audio sample can be received (e.g., by an input component). At 1004, a spectrogram can be generated (e.g., by a spectrogram component). At 1006, a set of anchor points can be generated (e.g., by an anchor detection component) wherein anchor points in the set of anchor points are local maxima in time/frequency windows of the spectrogram. At 1008, a set of interest points can be generated (e.g., by an interest point detection component) based on a strength threshold and a set of frequency bands. At 1010, a set of histograms can be generated (e.g., by a histogram component) based on the set of anchor points, the set of interest points and a set of frequency bins wherein histograms in the set of histograms are associated with an anchor point among the set of anchor points. At 1012, a set of feature vectors can be generated (e.g., by a feature vector component) based on the set of histograms wherein feature vectors in the set of feature vectors are associated with an anchor point among the set of anchor points and contain a count of interest points within respective frequency bins.

At 1014, the set of feature vectors can be quantized (e.g., by a descriptor component). At 1016, the set of feature vectors can be hashed (e.g., by a descriptor component). In one implementation, the feature vectors can be hashed using a weighted minhash. At 1018, a set of descriptors can be generated (e.g., by a descriptor component) based on the quantized and hashed set of feature vectors. In one implementation, the set of descriptors can be generated further based on a time window and a time step.

Figure 11:
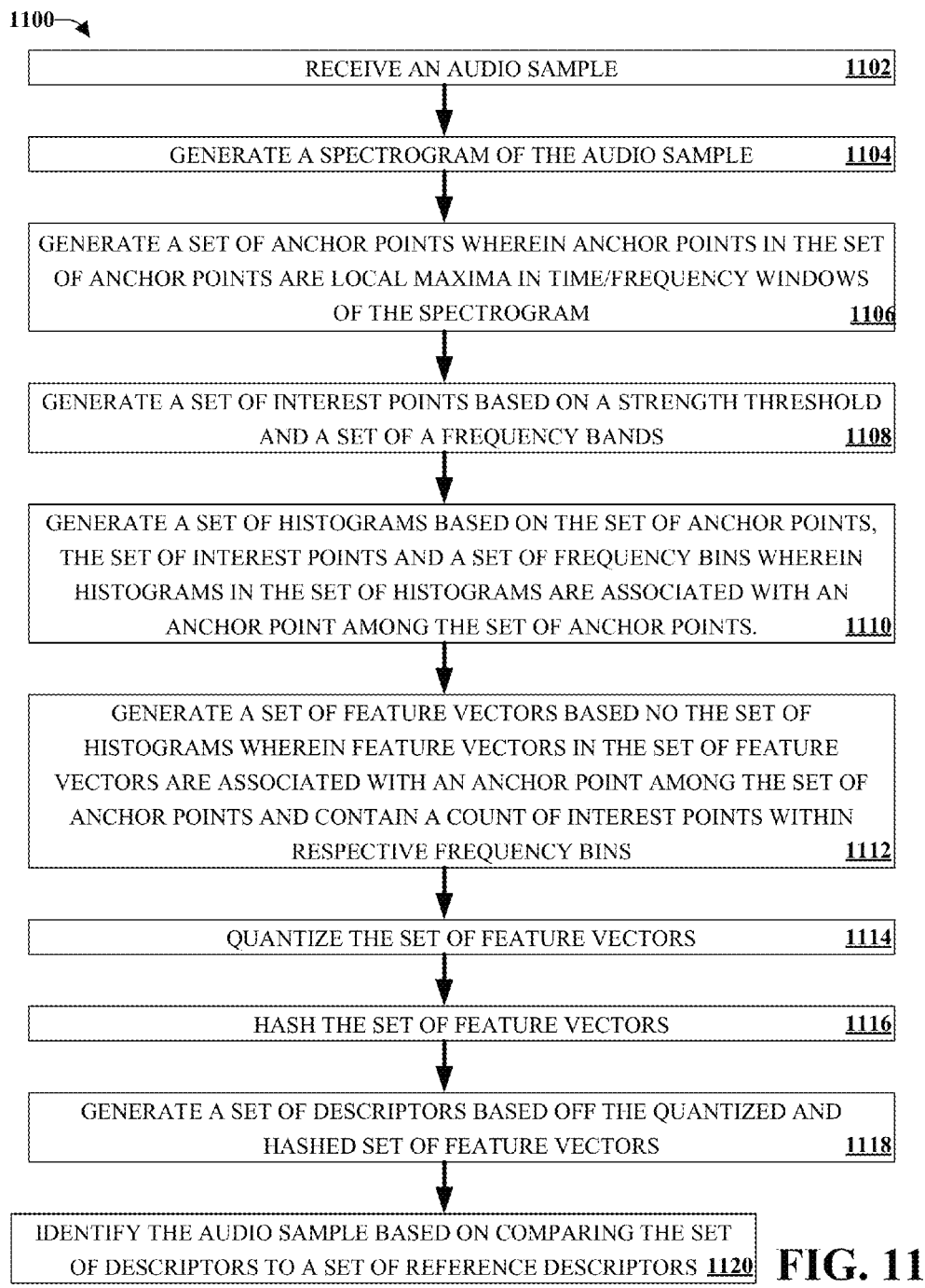
FIG. 11 illustrates an example method for audio matching including identifying an audio sample in accordance with implementations of this disclosure.

Referring now to FIG. 11 there is illustrated an example method for audio matching including identifying an audio sample in accordance with implementations of this disclosure. At 1102, an audio sample can be received (e.g., by an input component). At 1104, a spectrogram can be generated (e.g., by a spectrogram component). At 1106, a set of anchor points can be generated (e.g., by an anchor detection component) wherein anchor points in the set of anchor points are local maxima in time/frequency windows of the spectrogram. At 1108, a set of interest points can be generated (e.g., by an interest point detection component) based on a strength threshold and a set of frequency bands. At 1110, a set of histograms can be generated (e.g., by a histogram component) based on the set of anchor points, the set of interest points and a set of frequency bins wherein histograms in the set of histograms are associated with an anchor point among the set of anchor points.

At 1112, a set of feature vectors can be generated (e.g., by a feature vector component) based on the set of histograms wherein feature vectors in the set of feature vectors are associated with an anchor point among the set of anchor points and contain a count of interest points within respective frequency bins. At 1114, the set of feature vectors can be quantized (e.g., by a descriptor component). At 1116, the set of feature vectors can be hashed (e.g., by a descriptor component). At 1118, a set of descriptors can be generated (e.g., by a descriptor component) based on the quantized and hashed set of feature vectors. At 1120, the audio sample can be identified based on comparing the set of descriptors to a set of reference descriptors, using, for example, a hamming distance.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 12:
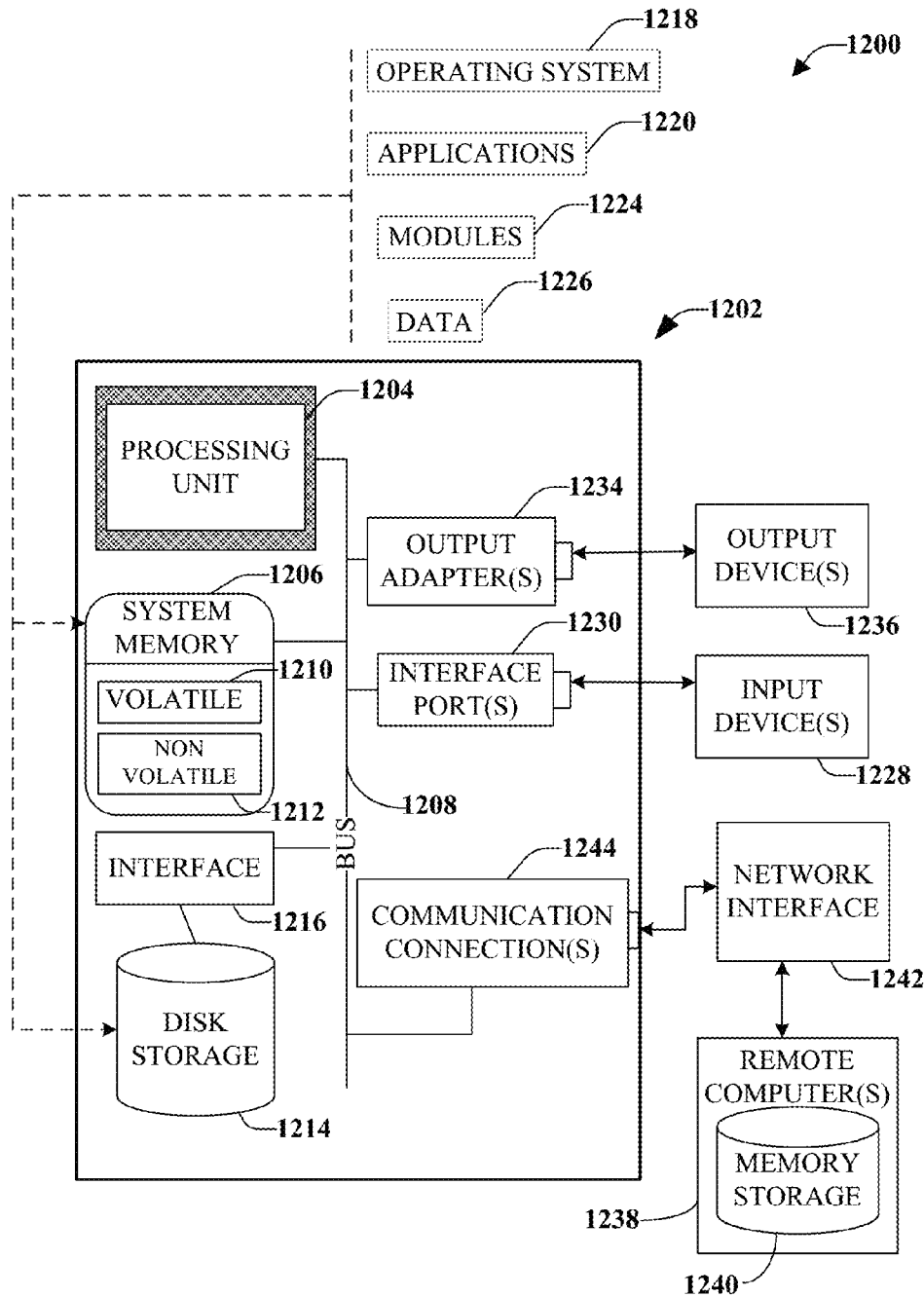
FIG. 12 illustrates an example block diagram of a computer operable to execute the disclosed architecture in accordance with implementations of this disclosure.

With reference to FIG. 12, a suitable environment 1200 for implementing various aspects of the claimed subject matter includes a computer 1202. It is to be appreciated that the computer, 1202 can be used in connection with implementing one or more of the systems or components shown and described in connection with FIGS. 1-4. The computer 1202 includes a processing unit 1204, a system memory 1206, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1206 includes volatile memory 1210 and non-volatile memory 1212. The basic input/output system (BIOS), containing the basic routines to transfer information between elements within the computer 1202, such as during start-up, is stored in non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), or flash memory. Volatile memory 1210 includes random access memory (RAM), which acts as external cache memory. According to present aspects, the volatile memory may store the write operation retry logic (not shown in FIG. 12) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 1202 may also include removable/non-removable, volatile/non-volatile computer storage media. FIG. 12 illustrates, for example, a disk storage 1214. Disk storage 1214 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1214 to the system bus 1208, a removable or non-removable interface is typically used, such as interface 1216.

It is to be appreciated that FIG. 12 describes software that acts as an intermediary between users and the basic computer resources described in the suitable operating environment 1200. Such software includes an operating system 1218. Operating system 1218, which can be stored on disk storage 1214, acts to control and allocate resources of the computer system 1202. Applications 1220 take advantage of the management of resources by operating system 1218 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s) 1228. Thus, for example, a USB port may be used to provide input to computer 1202, and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

Figure 13:
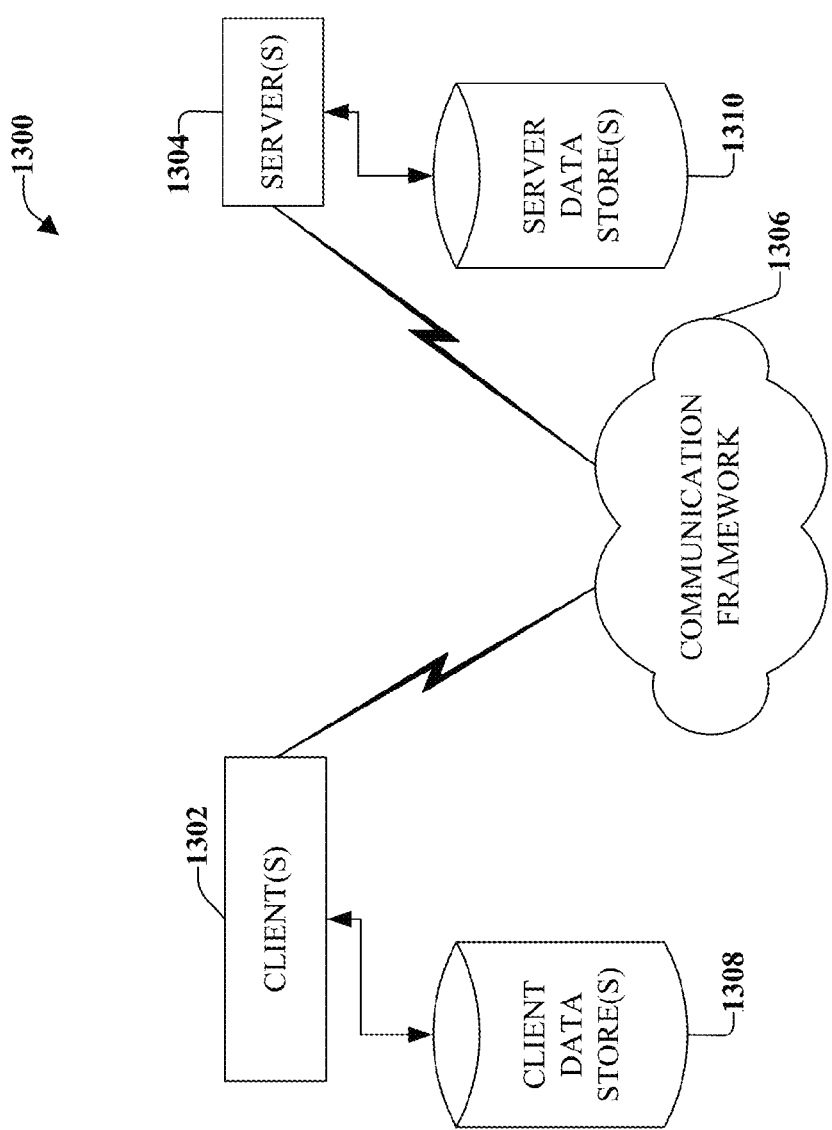
FIG. 13 illustrates an example schematic block diagram for a computing environment in accordance with implementations of this disclosure.

Referring now to FIG. 13, there is illustrated a schematic block diagram of a computing environment 1300 in accordance with the subject specification. The system 1300 includes one or more client(s) 1302, which can include an application or a system that accesses a service on the server 1304. The client(s) 1302 can be hardware and/or software (e.g., threads, processes, computing devices). The client(s) 1302 can house cookie(s), metadata, and/or associated contextual information and can also house threads to perform, for example, receiving an audio sample, generating spectrograms, detecting anchor points, detecting interest points, generating histograms, filtering histograms, generating descriptors, identifying audio samples, etc. in accordance with the subject disclosure.

The system 1300 also includes one or more server(s) 1304. The server(s) 1304 can also be hardware or hardware in combination with software (e.g., threads, processes, computing devices). The servers 1304 can house threads to perform, for example, receiving an audio sample, generating spectrograms, detecting anchor points, detecting interest points, generating histograms, filtering histograms, generating descriptors, identifying audio samples, etc. in accordance with the subject disclosure. One possible communication between a client 1302 and a server 1304 can be in the form of a data packet adapted to be transmitted between two or more computer processes where the data packet contains, for example, an audio sample or descriptors associated with an audio sample. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
   a memory that has stored thereon computer executable components; and
   a processor that executes the following computer executable components stored in the memory:
      an input component that receives an audio sample;
      a spectrogram component that generates a spectrogram of the audio sample;
      an anchor detection component that generates a set of anchor points, wherein anchor points in the set of anchor points are local maxima in time/frequency windows of the spectrogram;
      an interest point detection component that generates a set of interest points based on a defined strength threshold and a set of frequency bands;
      a histogram component that, for each anchor point:
         establish a frequency window around the anchor point,
         identifies a predetermined number of closest interest points of the set of interest points to the anchor point within the frequency window,
         divides the frequency window into a plurality of frequency bins,
         determines respective counts of interest points of the closest interest points that lie within each frequency bin, and
         generates a histogram for the anchor point based upon the respective counts of interest points of the closest interest points that lie within each frequency bin; and
      a matching component that matches the audio sample to at least one reference audio sample based on comparing a set of descriptors generated from the histograms to sets of reference descriptors associated with a set of reference audio samples.

2. The system of claim 1, further comprising:
   a filter component that filters the histograms based on at least one of inactive frequency bins or equal frequency bin activity.

3. The system of claim 1, further comprising:
   a feature vector component that generates a set of feature vectors based on the histograms, wherein a feature vector in the set of feature vectors is associated with the anchor point and contains the respective counts of interest points of the closest interest points that lie within each frequency bin.

4. The system of claim 3, further comprising:
   a descriptor component that generates the set of descriptors for the audio sample by quantizing and hashing the set of feature vectors.

5. The system of claim 4, wherein the descriptor component generates the set of descriptors further based on a time window and a time step.

6. The system of claim 4, wherein the descriptor component hashes the set of feature vectors using a weighted min-hash.

7. The system of claim 1, wherein the defined strength threshold is a predetermined percentage of interest points with a highest strength, and the interest point detection component generates the set of interest points by selection of the predetermined percentage of interest points with the highest strength in each frequency band of the set of frequency bands.

8. The system of claim 7, wherein respective sizes of the frequency bands increases as the associated frequencies increase.

9. The system of claim 1, wherein the anchor point is at a center of the frequency window.

10. A method comprising:
    receiving, by system including a processor, an audio sample;
    generating, by the system, a spectrogram of the audio sample;

generating, by the system, a set of anchor points, wherein anchor points in the set of anchor points are local maxima in time/frequency windows of the spectrogram;

generating, by the system, a set of interest points based on a defined strength threshold and a set of frequency bands;

for each anchor point:
- establishing, by the system, a frequency window around the anchor point,
- identifying, by the system, a predetermined number of closest interest points of the set of interest points to the anchor point within the frequency window,
- dividing, by the system, the frequency window into a plurality of frequency bins,
- determining, by the system, respective counts of interest points of the closest interest points that lie within each frequency bin, and
- generating, by the system, a histogram for the anchor point based upon the respective counts of interest points of the closest interest points that lie within each frequency bin; and matching the audio sample to at least one reference audio sample based on comparing a set of descriptors generated from the histograms to sets of reference descriptors associated with a set of reference audio samples.

11. The method of claim 10, the acts further comprising:
filtering, by the system, the histograms based on at least one of inactive frequency bins or equal frequency bin activity.

12. The method of claim 10, the acts further comprising:
generating, by the system, a set of feature vectors based on the histograms, wherein a feature vector in the set of feature vectors is associated with the anchor point and contains the respective counts of interest points of the closest interest points that lie within each frequency bin.

13. The method of claim 12, the acts further comprising:
quantizing, by the system, the set of feature vectors;
hashing, by the system, the set of feature vectors; and
generating, by the system, the set of descriptors for the audio sample based on the quantizing and the hashing.

14. The method of claim 13, wherein the generating comprises generating the set of descriptors based on a time window and a time step.

15. The method of claim 13, wherein the hashing comprises hashing the set of feature vectors using a weighted minhash.

16. The method of claim 13, wherein the defined strength threshold is a predetermined percentage of interest points with a highest strength, and the generating the set of interest points comprises selecting the predetermined percentage of interest points with the highest strength in each frequency band of the set of frequency bands.

17. The method of claim 16, wherein respective sizes of the frequency bands increases as the associated frequencies increase.

18. The method of claim 10, wherein the anchor point is at a center of the frequency window.

19. A non-transitory computer-readable medium comprising computer-executable instructions that, in response to execution, cause a system including a processor to perform operations, comprising:

receiving an audio sample;

generating a spectrogram of the audio sample;

generating a set of anchor points, wherein anchor points in the set of anchor points are local maxima in time/frequency windows of the spectrogram;

generating a set of interest points based on a defined percentile for strength and a set of frequency bands;

for each anchor point:
- establishing a frequency window around the anchor point,
- identifying a predetermined number of closest interest points of the set of interest points to the anchor point within the frequency window,
- dividing the frequency window into a plurality of frequency bins,
- determining respective counts of interest points of the closest interest points that lie within each frequency bin, and
- generating a histogram for the anchor point based upon the respective counts of interest points of the closest interest points that lie within each frequency bin; and matching the audio sample to at least one reference audio sample based on comparing a set of descriptors generated from the histograms to sets of reference descriptors associated with a set of reference audio samples.

20. The non-transitory computer-readable medium of claim 19, the operations further comprising:
generating a set of feature vectors based on the histograms, wherein a feature vector in the set of feature vectors is associated with the anchor point and contains the respective counts of interest points of the closest interest points that lie within each frequency bin;
quantizing the set of feature vectors;
hashing the set of feature vectors; and
generating the set of descriptors for the audio sample based on the quantizing and the hashing.

* * * * *